Aug. 25, 1931.  H. O. BREAKER  1,820,879
HEAT TREATING FURNACE
Filed March 3, 1928   5 Sheets-Sheet 4

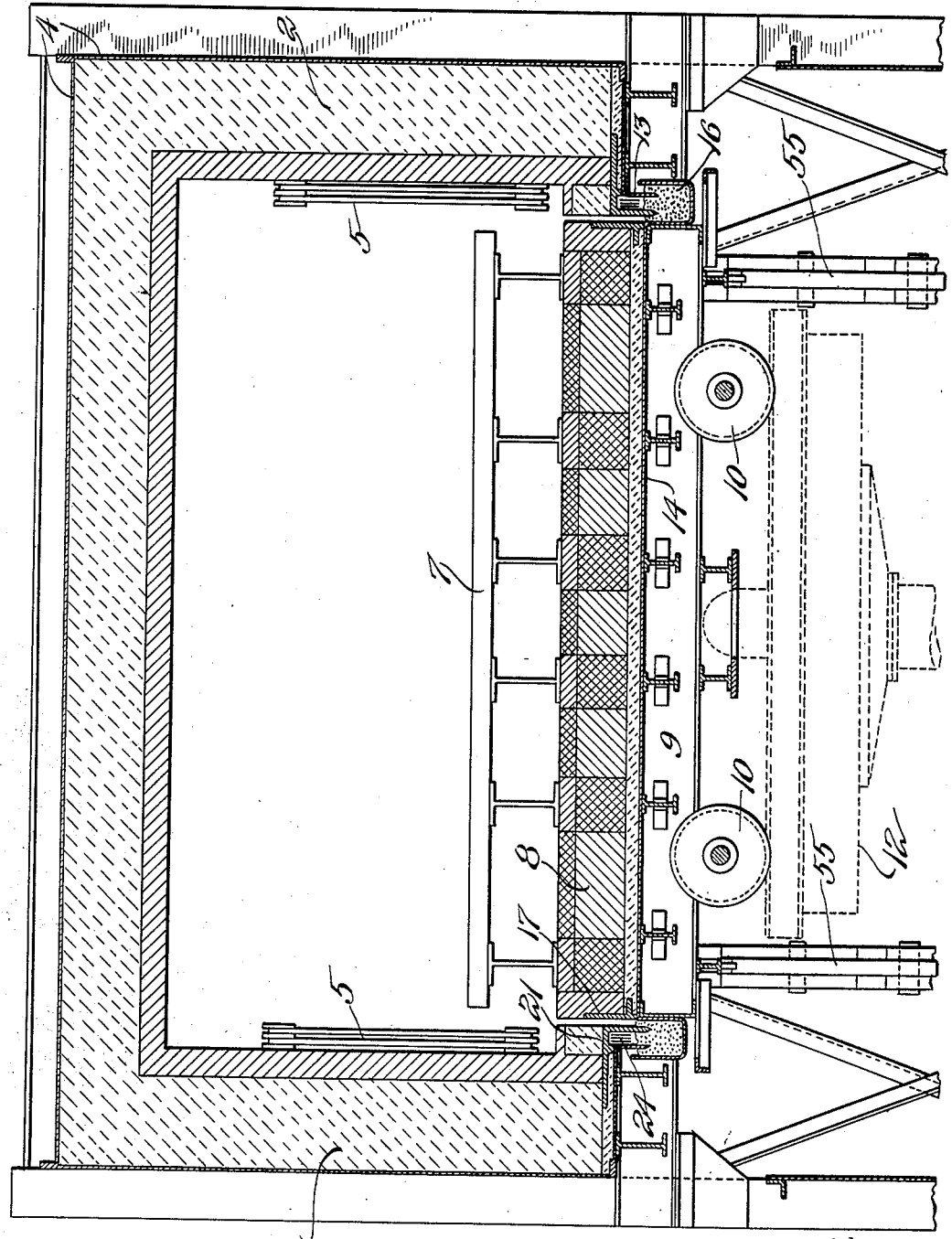

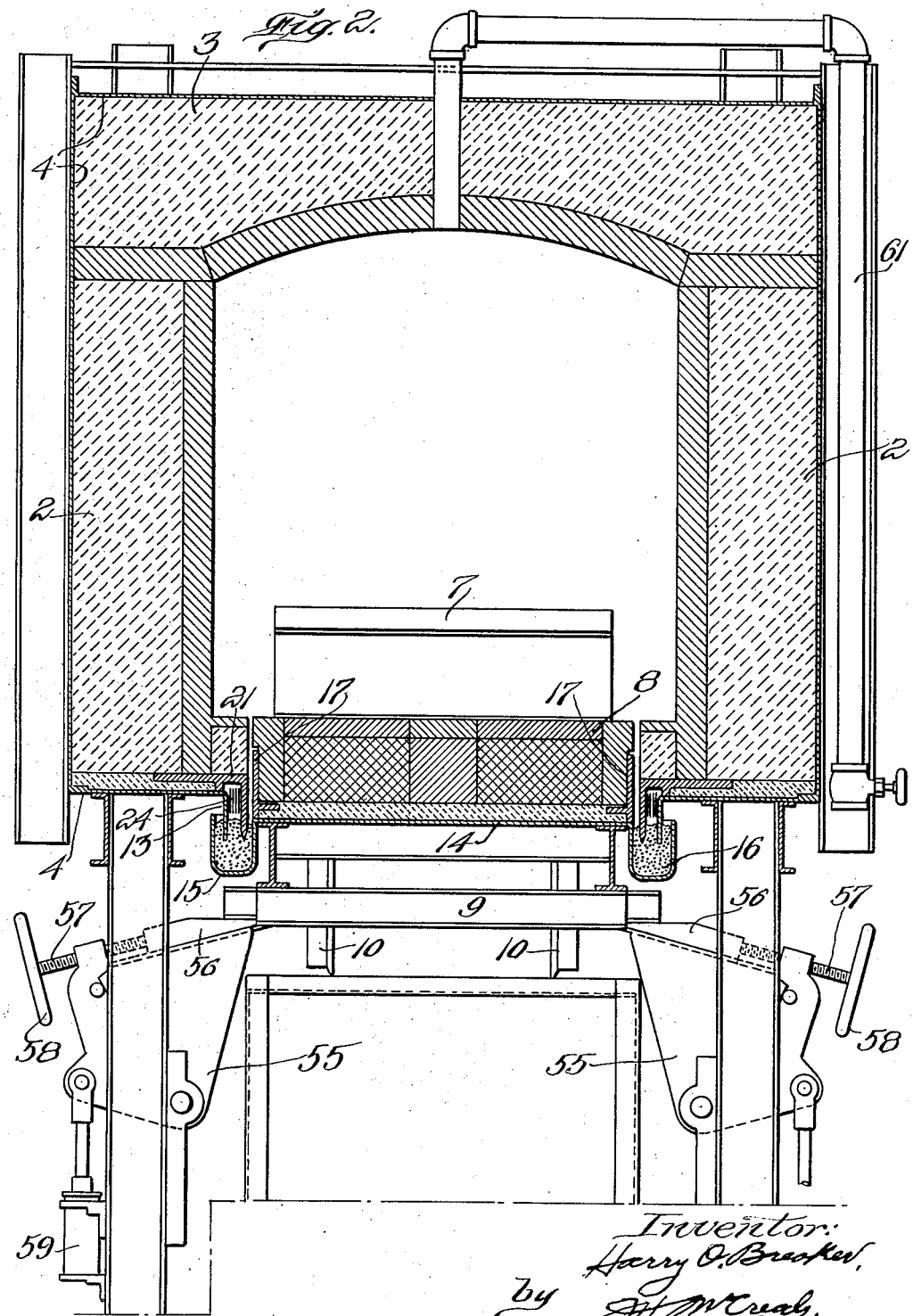

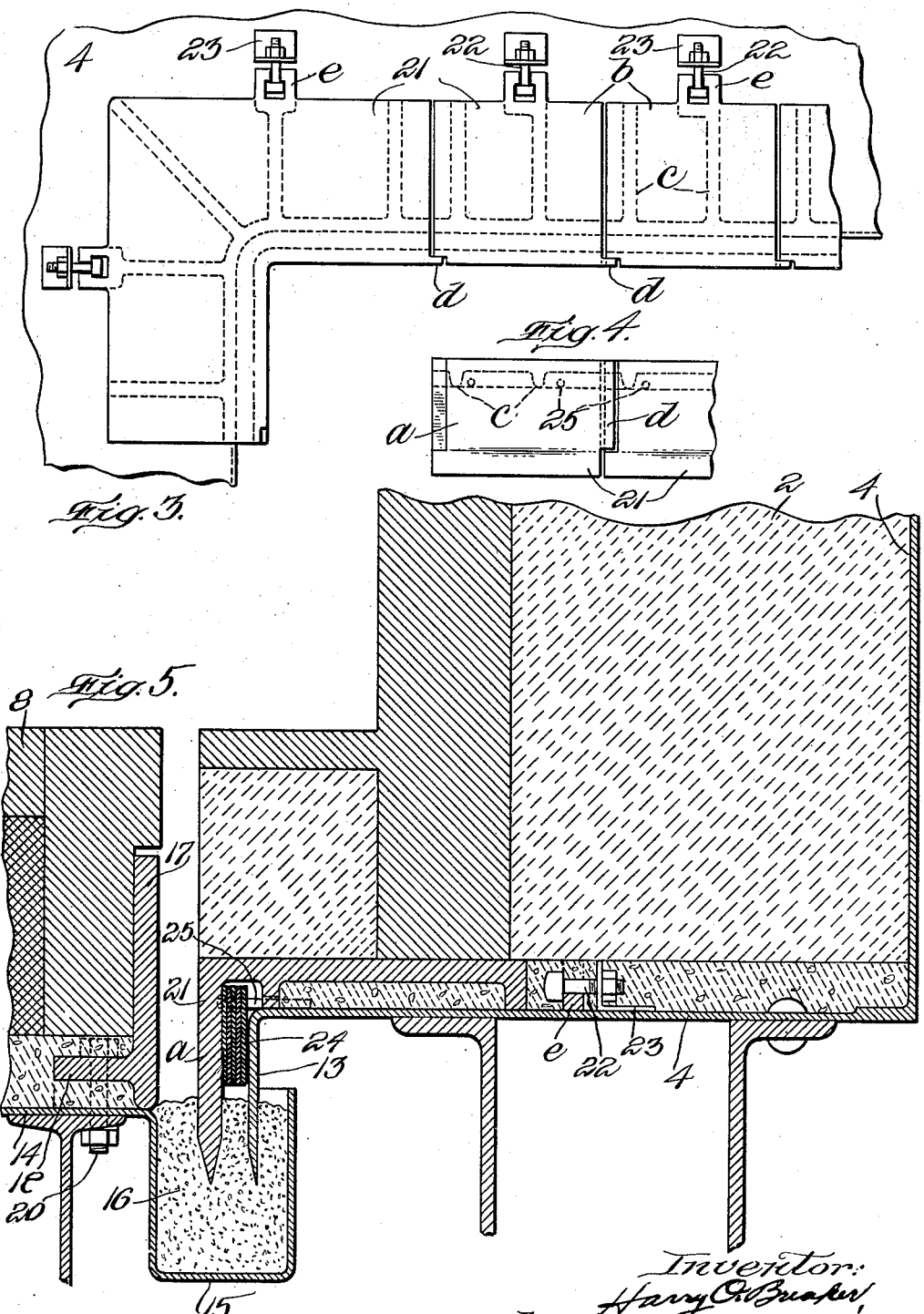

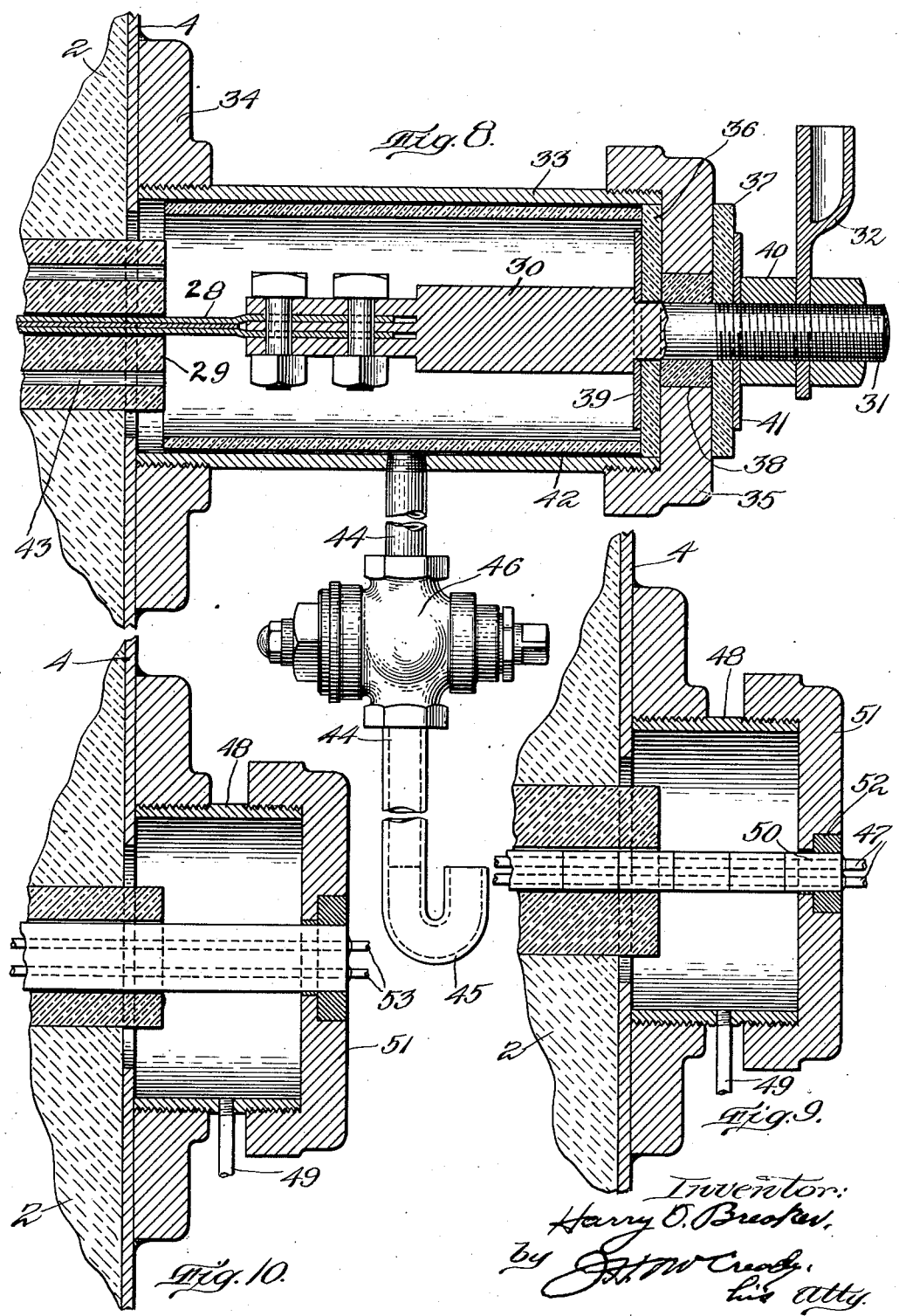

Patented Aug. 25, 1931

1,820,879

UNITED STATES PATENT OFFICE

HARRY O. BREAKER, OF BUFFALO, NEW YORK, ASSIGNOR TO INDUSTRIAL FURNACE CORPORATION, OF BUFFALO, NEW YORK

HEAT TREATING FURNACE

Application filed March 3, 1928. Serial No. 258,853.

This invention relates to electric furnaces and more especially to the general type of furnace disclosed in my Patent No. 1,636,041. The furnace shown in said application represents a substantial advance in this art and has proved especially valuable in the annealing and heat treating of metal parts. A characteristic of the furnace which makes it particularly valuable for this purpose is the fact that substantially the same atmosphere is retained in the furnace during the treatment of successive charges. The oxygen in this atmosphere is quickly burned out or may be removed by initially treating a load of metal chips, and the atmosphere remaining in the furnace thereafter is inert or at least nonoxidizing, so that scaling of the metal parts is substantially eliminated.

The present invention aims to improve and perfect furnaces of this type with a view to reducing to a minimum any interchange of atmosphere between the chamber in the furnace and the outside air, making the furnace substantially gas tight and improving the sealing means.

At the extremely high temperatures which frequently are generated in these furnaces any moisture occluded in the metal parts which make up the load, or which finds its way into the furnace in any other manner may be broken down, thus liberating hydrogen and oxygen. While the quantity of oxygen admitted to the furnace in this manner can be reduced very substantially by a careful handling of the metal parts prior to introducing them into the furnace, a certain amount of moisture appears to be contained in the pores of the metal and is liberated only at elevated temperatures. It is, therefore, a further object of this invention to devise means for reducing the liberation of oxidizing gases in the furnace from this cause.

The manner in which it is proposed to accomplish these and other objects of the invention will be readily understood from the following description when read in connection with the accompanying drawings, and the novel features will be particularly pointed out in the appended claims.

In the drawings,

Figure 1 is a longitudinal, vertical, cross-sectional view through the upper part of a furnace constructed in accordance with this invention;

Fig. 2 is a transverse, vertical, cross-sectional view of the furnace shown in Fig. 1;

Fig. 3 is a plan view showing certain details of construction of the sealing means;

Fig. 4 is a side elevation of certain of the parts shown in Fig. 3;

Fig. 5 is a vertical, cross-sectional view showing details of construction at the bottom of the furnace and the sand seal;

Figs. 8, 9 and 10 are cross-sectional views showing certain details of the terminal constructions.

Figure 6:
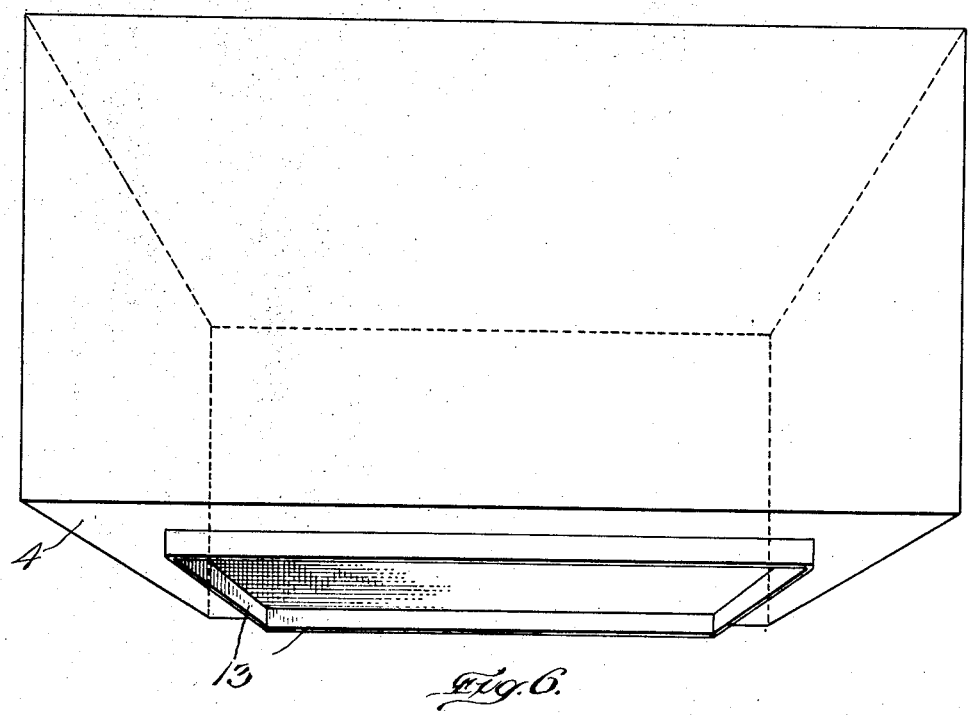
Fig. 6 is a perspective view of the metal shell which encloses the furnace walls.
Figure 7:
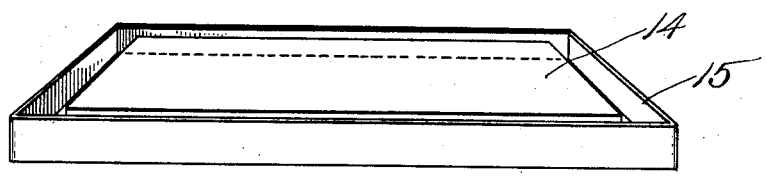
Fig. 7 is a perspective view showing the metal shell for the removable bottom of the furnace.

The construction shown in the drawings comprises an electric furnace having side walls 2 and a top 3. Both the walls and the top usually comprise a lining of vitreous brick or other fire resistant material backed by suitable heat insulating materials, this entire structure being enclosed in a metal shell 4. Metallic resistors 5, Fig. 1, are secured to the side walls 2 and are connected with suitable sources of current to generate the necessary degree of heat in the furnace. The furnace is supported in an elevated position by structural steel members, as disclosed more fully in my patent above designated.

The hearth 7 of the furnace is mounted on or forms part of a bottom 8 which in the present instance is supported on a car, the frame or body of the car being indicated at 9, and the wheels at 10. In order to raise the bottom of the furnace into its operative position as shown in Figs. 1 and 2 and to lower it again for loading and unloading, the car is mounted on the platform 12 of an elevator of any suitable type, a plunger elevator preferably being used. The details of this construction are disclosed more fully in my prior patent above designated.

As above stated, an important object of this invention is to make the furnace gas tight so far as possible. I have found that in operating these furnaces at the high temperatures which are used in annealing metal parts, a very considerable leakage of air takes place through the refractory and heat insulating sections of the wall, the air ultimately finding its way out through the joints in the metal shell. In order to prevent such leakage the shell 4 shown in the drawings is made of relatively few parts, and the joints or seams are made gas tight. Preferably this is accomplished by welding all the seams and joints so that the shell when completed is an integral structure as indicated, for example, in Fig. 6. This sheet metal shell encloses all the stationary parts of the furnace and includes a section extending under the lower part of the furnace to the edge of the opening therein, the shell at this point being bent downwardly to provide a continuous flange 13 surrounding said opening and adapted to enter the sand seal carried by the furnace bottom.

Preferably the metal shell 14 which forms part of the removable furnace bottom 8 also has all its joints and seams welded so that it is an integral structure, and the trough 15 which surrounds the furnace bottom and receives the sand or other sealing medium 16 likewise is made integral with, or is welded to, the part 14. Consequently, in this construction the only opportunity for the escape of air or gases from the furnace chamber is through the sand seal 16. Any leakage which can occur here is produced chiefly, if not entirely, by the expansion of the gases in the furnace and is not troublesome for the reason that it does not tend to produce an inward flow of outside atmosphere into the furnace chamber.

As above stated, the temperatures generated in these furnaces run very high, a temperature of 1600° to 1800° F. being common, and at such high temperatures it is important to reduce the transmission of heat to the sealing trough 15 and the flange 13 in order to avoid sufficient expansion of these parts to produce buckling. For this purpose the metal shell 14 which underlies the furnace bottom 8 is well insulated from the I beams and other metal parts at the upper side of said bottom, and the insulating material which forms the greater part of the main body of the hearth is confined laterally by metal plates or hearth locking castings 17 (see Figs. 1, 2 and 5) which surround the bottom, the lower face of each plate being ribbed so that these ribs make only a line contact with the shell 14. Each of these parts 17 has an inwardly projecting horizontal flange 18, Fig. 5, through which a bolt 20 passes, this bolt fastening the plate to one of the I-beams which support the furnace bottom. Due to this construction the transmission of heat to the shell 14 is reduced substantially to a minimum.

For the purpose of shielding the knife edged flange 13 of the outer shell 4 from the heat of the furnace, a second flange is located just inside the flange 13. This second flange comprises a series of plates 21, best shown in Figs. 3, 4 and 5, each of these plates being of angular form and having a downwardly projecting knife edged flange section $a$, and a horizontally disposed section $b$ which is provided with lugs or ribs $c$ to bear on the inner surface of the shell 4. The edges of these lugs are rounded or tapered so that they present a minimum of contact with the shell through which the heat would be conducted, and each plate has an upright marginal portion $d$, Figs. 3 and 4, to overlap the next adjacent plate, the section $d$ fitting into a notch in the adjoining plate. Such a construction permits expansion and contraction of the individual plates without permitting any plate to disturb its neighbor. At the rearward edge of each plate it is provided with a slotted lug $e$ to receive the head of a bolt 22 which cooperates with a bracket 23 welded to the shell to draw the upright sections $a$ of the plates 21 backwardly toward the continuous flange 13 and hold it in its operative position. Between the sections $a$ and the flange 13 a series of plates 24 of asbestos or other heat insulating material is interposed, these plates being supported partly by the pins 25 and partly by the fact that they are pinched between the flanges $a$ and 13. They serve to heat insulate the inner sectional flange $a$ from the outer continuous flange 13.

It will thus be observed that the furnace has two knife edged flanges surrounding the opening in the bottom thereof to enter the sand seal 16. The inner of these flanges, which is subjected to the higher temperature, is composed of sections while the outer flange 13 is continuous and is heat insulated from the inner flange. An exceptionally effective seal thus is provided which is particularly valuable in a furnace operated at high temperatures.

In annealing or otherwise heat treating metal parts in this furnace, care is taken to have the parts dry before they are put into the furnace. At the same time a certain amount of moisture is present in any charge of metal parts and this moisture is released or driven out as the temperature of the metal parts is raised. As above stated, furnaces of this type frequently are operated at such high temperatures that the moisture will be broken up into hydrogen and oxygen. I have found that the quantity of oxygen liberated in the furnace in this manner can be reduced very substantially by equipping the furnace with a condenser. Such a condenser may conveniently be combined with the casing for the terminals which conduct electricity to the resistors. Referring to Fig. 8, which shows one of these combined terminal and condenser constructions, it will be observed that the conductor 28 which leads to one end of a resistor, extends through an insulating bushing 29 in the wall 2 of the furnace, and that this conductor is bolted to a bar 30 of copper, or the like, having a threaded stem 31 to which a cable terminal 32 is secured. The junction between the parts 28 and 30 is enclosed in a metal cylinder 33 usually consisting of a short section of pipe, one end of which is threaded into a base 34 that is welded to the furnace shell 4. The other end of this pipe is provided with a cap 35 having an aperture to permit the passage therethrough of the stem 31, this stem being insulated from the cap by suitable washers 36 and 37 and a bushing 38. The bar 30 is shouldered inside the casing or housing 33 to receive a metal washer 39, and a nut 40 threaded on the stem 31 cooperates with a washer 41 and the washer 39 to clamp the insulating washers 36 and 37 securely in place. Preferably an insulating sleeve 42 also is located loosely in the housing or casing 33 and surrounds the conductors.

All the joints of the casing 33 and those around the conductors where they pass through the cap 35 are made gas tight so that gas leakage through the housing is prevented. At the same time the chamber in the housing 33 is in free communication with the furnace chamber, this communication being provided by holes 43 formed in the bushing 29, or more commonly, simply by the fact that there is considerable clearance between the conductor 28 and the walls of the aperture in the bushing through which this conductor extends. Due to the fact that the housing 33 projects from the outer wall of the shell where the outside atmosphere circulates freely around it, the temperature inside this housing is only slightly above atmospheric temperature, and water vapor present in the air which circulates through this housing condenses freely in the housing. This action occurs while the charge is heating up so that by the time the temperature reaches a point at which the water would break down practically all the moisture has been removed. Experience has demonstrated that this construction does condense water vapor carried by the atmosphere in the furnace chamber and reduces very substantially the quantity of such water vapor which will remain in the furnace.

In order to draw off the water so condensed, it is usually preferable to tap a pipe 44 into the lower side of the housing 33 and lead this water through a trap 45 so that the water can drain substantially as fast as it is condensed, while the trap will prevent the flow of outside air inwardly to the furnace chamber. A shunt-off valve 46 connected into the drain pipe 44 permits the closing of this pipe whenever desired, or provides for the intermittent drawing off of the water of condensation if preferred for any reason.

A construction similar to that shown in Fig. 8 preferably is used in connection with each of the electrical connections from the furnace. Fig. 9 shows a connection suitable for the thermo-couple with which a furnace of this type usually is equipped. The conductors 47—47 are led through a housing 48 similar to the housing 33 and thence through the wall 2 of the furnace, this housing 48 being gas tight and provided with a drain pipe 49 leading to a trap or shut-off valve. Where the conductors 47—47 pass through the end of the housing 48 they are cemented into an insulating bushing 50 and this bushing likewise is cemented to the housing cap 51 as shown at 52.

Essentially the same construction also is used where the fuse leads 53—53 are conducted through the furnace wall 2, as shown in Fig. 10.

For the purpose of holding the furnace bottom in its closed or operative position while the elevator platform is lowered, the frame of the furnace is equipped with stops 55 of the construction best shown in Fig. 2. These stops are mounted to swing into and out of their operative positions. Also, each stop is provided on its upper edge with a wedge 56 slidable in a grooved way formed in the stop and adjustable by means of a screw 57 arranged to be operated by a hand wheel 58. With this construction the furnace bottom may be moved into its uppermost position, the stops swung inwardly, and the hand wheels operated, if necessary, to adjust the wedges 56 to hold the furnace bottom in its uppermost position. In prior constructions it has sometimes been necessary to move the furnace bottom to its upper position, then operate the stops, and subsequently to allow the bottom to drop back slightly to meet the stops. The stop construction here shown locks the furnace bottom securely in its upper position. Usually it is preferable to operate the stops simultaneously either hydraulically or by air pressure and for this purpose each stop may be connected with a cylinder such as that shown at 59.

In some cases it is desirable to treat the metal parts in a gaseous atmosphere of a specific composition, and the furnace therefore is shown equipped with a pipe connection 61 through which gas of any desired character can be introduced into the furnace chamber. This construction can also be used for scavenging purposes.

The furnace construction provided by this invention is especially adapted for the heat treatment of metal parts of high temperatures. It is exceptionally efficient in operation, and the fact that the atmosphere maintained in it is non-oxidizing is a very important practical advantage in reducing the scaling of the treated parts.

Having thus described my invention, what I desire to claim as new is:

1. In an apparatus of the character described, the combination of an electric furnace including fixed top and side walls and a removable bottom, an elevator for raising said bottom into its cooperative relationship to said walls and lowering said bottom into position to discharge or receive a load, a flange projecting downwardly from the lower side of said furnace and surrounding the opening therein normally closed by said bottom, a trough carried by and surrounding said bottom and adapted to receive said flange when the bottom is moved into its closed position, a furnace hearth carried by said bottom, said hearth including a main body of heat insulating material and upwardly projecting metal parts 17 substantially surrounding the lower portion of said main body, and means for holding said trough and said metal parts in their cooperative relationship to each other.

2. In an apparatus of the character described, the combination of an electric furnace including top and side walls and a removable bottom, an elevator for raising said bottom into its cooperative relationship to said walls and lowering said bottom into position to discharge or receive a load, a flange projecting downwardly from the lower side of said furnace and surrounding the opening therein normally closed by said bottom, said flange comprising a series of flange sections overlapping each other, whereby they may expand and contract relatively to each other, and means surrounding said bottom and adapted to receive said flange when the bottom is in its closed position to seal the space between said bottom and the fixed parts of the furnace.

3. In an apparatus of the character described, the combination of an electric furnace including top and side walls and a removable bottom, an elevator for raising said bottom into its cooperative relationship to said walls and lowering said bottom into position to discharge or receive a load, a flange projecting downwardly from the lower side of said furnace and surrounding the opening therein normally closed by said bottom, said flange comprising a series of flange sections overlapping each other, whereby they may expand and contract relatively to each other, a second flange surrounding said sectional flange and projecting downwardly from the lower side of the furnace, heat insulating material between said flanges arranged to reduce the heat transfer from one flange to the other, a trough surrounding said bottom and adapted to receive both of said flanges when the bottom is in its closed position, and sealing means in said trough.

4. In an apparatus of the character described, the combination of an electric furnace including top and side walls and a removable bottom, an elevator for raising said bottom into its cooperative relationship to said walls and lowering said bottom into position to discharge or receive a load, a flange projecting downwardly from the lower side of said furnace and surrounding the opening therein normally closed by said bottom, said flange comprising a series of flange sections overlapping each other, whereby they may expand and contract relatively to each other, said furnace including a substantially gas tight outer metal casing, a second flange surrounding said sectional flange and having a gas tight connection with said casing, heat insulating material between said flanges arranged to reduce the heat transfer from one flange to the other, a trough surrounding said bottom and adapted to receive both of said flanges when the bottom is in its closed position, and sealing means in said trough.

5. In an apparatus of the character described, the combination of an electric furnace including fixed top and side walls and a removable bottom, an elevator for raising said bottom into its cooperative relationship to said walls and lowering said bottom into position to discharge or receive a load, said top and side walls including a gas tight metal shell enclosing them and a refractory heat insulating lining, and said shell having a portion extending under the margins of the lower side of the furnace around the opening therein which is normally closed by said bottom, a flange extending downwardly from the latter portion of said shell and surrounding said opening, a trough surrounding said bottom and adapted to receive said flange when the bottom is in its closed position, and sealing means in said trough.

6. In an apparatus of the character described, the combination of an electric furnace including fixed top and side walls and a removable bottom, an elevator for raising said bottom into its cooperative relationship to said walls and lowering said bottom into position to discharge or receive a load, said top and side walls including a gas tight metal shell with a refractory heat insulating lining, a gas tight metal casing secured to said shell externally thereof and having a gas tight connection therewith, an electrical conductor leading through said casing and into said furnace, and gas tight joints between said casing and said conductor.

7. In an apparatus of the character described, the combination of an electric furnace including fixed top and side walls and a removable bottom, an elevator for raising said bottom into its cooperative relationship to said walls and lowering said bottom into position to discharge or receive a load, said top and side walls including a gas tight metal shell with a refractory heat insulating lining, a gas tight metal casing secured to said shell externally thereof and having a gas tight connection therewith, an electrical conductor leading through said casing and into said furnace, gas tight joints between said casing and said conductor, and means for draining condensation from said casing.

8. In an apparatus of the character described, the combination of an electric furnace including fixed top and side walls and a removable bottom, an elevator for raising said bottom into its cooperative relationship to said walls and lowering said bottom into position to discharge or receive a load, and means for holding said bottom in its uppermost position while said elevator is lowered, said means including a stop movable into and out of locking position and a wedge adjustable on said stop.

9. In an apparatus of the character described, the combination of an electric furnace including fixed top and side walls and a removable bottom, an elevator for raising said bottom into its cooperative relationship to said walls and lowering said bottom into position to discharge or receive a load, said walls including a gas tight metal shell enclosing them and having a marginal portion extending under the lower side of the furnace and surrounding the opening therein which is normally closed by said bottom, a flange extending downwardly from the latter portion of said shell and surrounding said opening, said flange having a gas tight connection with said shell, a trough surrounding said bottom and adapted to receive said flange when the bottom is moved into its closed position, sealing material in said flange, a furnace hearth carried by said bottom and including metal parts, and means for heat insulating said trough from the inner metal parts of said hearth.

10. In a furnace of the class described and wherein means are provided for sealing the atmosphere within the furnace from interchange with the air outside of the furnace; means for condensing water vapor occurring within the furnace comprising a housing disposed externally of the furnace and in communication with the interior thereof by means of apertures of reduced area formed in the furnace wall, and a drain pipe connected to said housing, said drain pipe being provided with valve means permitting of the withdrawal of condensed vapor from said housing but preventing ingress of air from the exterior of said housing thereinto and into said furnace.

11. In a furnace wherein provision is made to exclude air from the work chamber thereof, an external casing secured to said furnace wall, gas tight connections sealing said casing on the exterior thereof, said casing being in communication with the interior of the furnace by means of an aperture formed in the furnace wall and terminating within the casing, electrical conducting means extending through said casing from the exterior thereof and into said furnace, said casing being maintained at a temperature below that in said furnace, whereby moisture in gases passing from said furnace into said casing is condensed therein, and valve means connected to said casing permitting of the egress of said condensed moisture but preventing the ingress of air.

HARRY O. BREAKER.